United States Patent
Fujishiro et al.

(10) Patent No.: US 10,939,251 B2
(45) Date of Patent: Mar. 2, 2021

(54) USER EQUIPMENT AND BASE STATION

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/271,391

(22) Filed: Feb. 8, 2019

(65) Prior Publication Data

US 2019/0182632 A1 Jun. 13, 2019

Related U.S. Application Data

(63) Continuation of application No. PCT/JP2017/028452, filed on Aug. 4, 2017.
(Continued)

(51) Int. Cl.
| | | |
|---|---|---|
| *H04W 4/06* | (2009.01) | |
| *H04W 72/00* | (2009.01) | |
| *H04W 48/16* | (2009.01) | |
| *H04W 4/70* | (2018.01) | |

(Continued)

(52) U.S. Cl.
CPC ............... *H04W 4/06* (2013.01); *H04W 4/50* (2018.02); *H04W 4/70* (2018.02); *H04W 8/08* (2013.01);
(Continued)

(58) Field of Classification Search
CPC ........................................................ H04W 4/06
See application file for complete search history.

(56) References Cited

U.S. PATENT DOCUMENTS

| | | | |
|---|---|---|---|
| 2011/0038299 A1 | 2/2011 | Sugawara et al. | |
| 2012/0076068 A1* | 3/2012 | Zhao .................... | H04L 1/0003 370/312 |

(Continued)

FOREIGN PATENT DOCUMENTS

| | | |
|---|---|---|
| JP | 2012-529781 A | 11/2012 |
| WO | 2009/131087 A1 | 10/2009 |
| WO | 2016/025836 A1 | 2/2016 |

OTHER PUBLICATIONS

Huawei et al., SC-PTM configuration and operation, 3GPP TSG RAN Working Group 2 Meeting #91, R2-153378, Aug. 24-28, 2015, pp. 1-7, Beijing, China.

(Continued)

*Primary Examiner* — John D Blanton
(74) *Attorney, Agent, or Firm* — Studebaker & Brackett PC

(57) ABSTRACT

A user equipment according to a first aspect is a user equipment for a mobile communication system. The user equipment transmits and receives radio signals within a reduced bandwidth narrower than a system transmission and reception band. The user equipment performs radio communication with a base station by using the transceiver. The base station provides MBMS services via SC-PTM. The user equipment receives first information from the base station. The first information indicates at least one of: a maximum number of repetitions of a physical downlink control channel having a bandwidth equal to or less than the reduced bandwidth and a maximum number of repetitions of a physical downlink shared channel having a bandwidth equal to or less than the reduced bandwidth. The first information is transmitted from the base station by a system information block for the SC-PTM or a multicast control channel for the SC-PTM.

6 Claims, 13 Drawing Sheets

Related U.S. Application Data

(60) Provisional application No. 62/372,919, filed on Aug. 10, 2016.

(51) Int. Cl.
| | | |
|---|---|---|
| *H04W 4/50* | (2018.01) | |
| *H04W 76/11* | (2018.01) | |
| *H04W 8/08* | (2009.01) | |
| *H04W 68/00* | (2009.01) | |
| *H04W 72/04* | (2009.01) | |
| *H04W 80/02* | (2009.01) | |
| *H04W 88/02* | (2009.01) | |

(52) U.S. Cl.
CPC ......... *H04W 48/16* (2013.01); *H04W 68/005* (2013.01); *H04W 72/005* (2013.01); *H04W 72/042* (2013.01); *H04W 76/11* (2018.02); *H04W 80/02* (2013.01); *H04W 88/02* (2013.01)

(56) References Cited

U.S. PATENT DOCUMENTS

| | | | | |
|---|---|---|---|---|
| 2017/0295552 | A1* | 10/2017 | Patel | H04W 72/0446 |
| 2019/0174510 | A1* | 6/2019 | Shin | H04W 72/042 |
| 2019/0223197 | A1* | 7/2019 | Shin | H04L 1/0031 |

OTHER PUBLICATIONS

Kyocera, Multicast enhancements for FeMTC, 3GPP TSG RAN Working Group 2 Meeting #95, R2-165056, Aug. 22-26, 2016, pp. 1-6, Gothenburg, Sweden.

Huawei (Rapporteur), "36.331 Running CR to capture agreements on NB-IoT", 3GPP TSG-RAN WG2 Meeting NB-IoT adhoc, R2-163220, Sophia Antipolis, France, May 3-4, 2016, 113 pages.

Huawei, HiSilicon, Neul Limited, "PHY configuration, ASN. 1 aspects", 3GPP TSG-RAN WG2 #93bis Meeting, R2-162322, Dubrovnik, Croatia, Apr. 11-15, 2016, 13 pages.

Potevio, "Issues of SC-PTM configuration", 3GPP TSG-RAN WG2 #91, R2-153472, Beijing, P.R.China, Aug. 24-28, 2015, 3 pages.

Intel Corporation, "New WID: High-Performance eMTC (HeMTC) for LTE", 3GPP TSG RAN Meeting #72, RP-161274, Jun. 13-16, 2016, 9 pages, Busan, Korea.

Qualcomm Incorporated, "New WI proposal for LTE MTC and NB-IoT enhancements", 3GPP TSG RAN Meeting #72, RP-161099, Jun. 13-16, 2016, 9 pages, Busan, Korea.

Huawei, "Views on LTE Rel-14", 3GPP TSG RAN Meeting #69, RP-151356, Sep. 14-16, 2015, 25 pages, Phoenix, USA.

Huawei, "Summary of email discussion: [91#23][LTE/SC-PTM] Service continuity", 3GPP TSG-RAN WG2 #91bis, R2-154196, Oct. 5-9, 2015, 12 pages, Malmö, Sweden.

* cited by examiner

FIG. 9
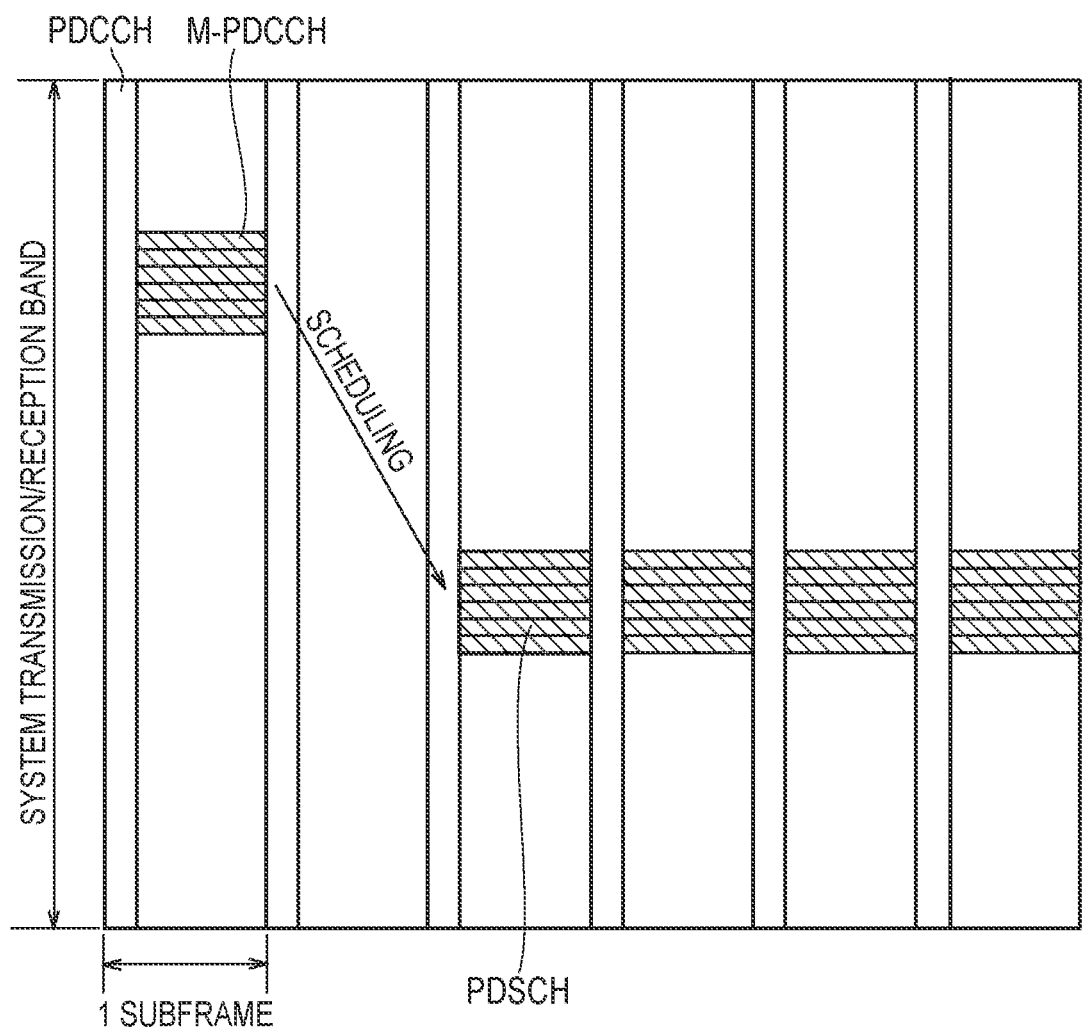
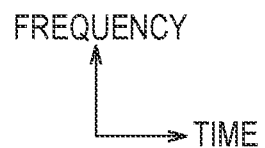

FIG. 11A

| BIT | DIRECT INDICATION INFORMATION |
|---|---|
| 1 | systemInfoModification |
| 2 | etws-INDICATION |
| 3 | cmas-INDICATION |
| 4 | eab-ParamModification |
| 5 | systemInfoModification-eDRX |
| 6, 7, 8 | NOT USED, AND SHALL BE IGNORED BY UE IF RECEIVED |

FIG. 11B

| BIT | FIELD IN DIRECT INDICATION INFORMATION |
|---|---|
| 1 | systemInfoModification |
| 2 | systemInfoModification-eDRX |
| 3, 4, 5, 6, 7, 8 | NOT USED, AND SHALL BE IGNORED BY UE IF RECEIVED |

FIG. 12

```
-- ASN1START

SystemInformationBlockType20 information element

SystemInformationBlockType20-r13 ::=    SEQUENCE {
    sc-mcch-RepetitionPeriod-r13        ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9)  OPTIONAL,
    sc-mcch-ModificationPeriod-r13      ENUMERATED {rf2, rf4, rf8, rf16, rf32, rf64, rf128, rf256,
                                            rf512, rf1024, r2048, rf4096, rf8192, rf16384, rf32768,
                                            rf65536},
    lateNonCriticalExtension            OCTET STRING    OPTIONAL,
    ...
}

-- ASN1STOP
```

FIG. 13

```
                        SCPTMConfiguration message
-- ASN1START

SCPTMConfiguration-r13 ::=      SEQUENCE {
    sc-mtch-InfoList-r13            SC-MTCH-InfoList-r13,
    scptm-NeighbourCellList-r13     SCPTM-NeighbourCellList-r13    OPTIONAL,   -- Need OP
    lateNonCriticalExtension        OCTET STRING                   OPTIONAL,
    nonCriticalExtension            SEQUENCE {}                    OPTIONAL
}

-- ASN1STOP
```

```
                     SC-MTCH-InfoList information element
-- ASN1START

SC-MTCH-InfoList-r13 ::=        SEQUENCE (SIZE (0..maxSC-MTCH-r13)) OF SC-MTCH-Info-r13

SC-MTCH-Info-r13 ::=            SEQUENCE    {
    mbmsSessionInfo-r13             MBMSSessionInfo-r13,
    g-RNTI-r13                      BIT STRING(SIZE(16)),
    sc-mtch-schedulingInfo-r13      SC-MTCH-SchedulingInfo-r13     OPTIONAL,   --
Need OP
    sc-mtch-neighbourCell-r13       BIT STRING (SIZE(maxNeighCell-SCPTM-r13))
    OPTIONAL,   -- Need OP
    ...
}

MBMSSessionInfo-r13 ::=         SEQUENCE    {
    tmgi-r13                        TMGI-r9,
    sessionId-r13                   OCTET STRING (SIZE (1))        OPTIONAL    -- Need OP
}

SC-MTCH-SchedulingInfo-r13::=   SEQUENCE    {
    onDurationTimerSCPTM-r13        ENUMERATED {
                                        psf1, psf2, psf3, psf4, psf5, psf6,
                                        psf8, psf10, psf20, psf30, psf40,
                                        psf50, psf60, psf80, psf100,
                                        psf200},
    drx-InactivityTimerSCPTM-r13    ENUMERATED {
                                        psf0, psf1, psf2, psf4, psf8,
                                        psf10, psf20, psf40,
                                        psf80, psf160, ps320,
                                        psf640, psf960,
                                        psf1280, psf1920, psf2560},
    schedulingPeriodStartOffsetSCPTM-r13    CHOICE {
        sf10                            INTEGER(0..9),
        sf20                            INTEGER(0..19),
        sf32                            INTEGER(0..31),
        sf40                            INTEGER(0..39),
        sf64                            INTEGER(0..63),
        sf80                            INTEGER(0..79),
        sf128                           INTEGER(0..127),
        sf160                           INTEGER(0..159),
        sf256                           INTEGER(0..255),
        sf320                           INTEGER(0..319),
        sf512                           INTEGER(0..511),
        sf640                           INTEGER(0..639),
        sf1024                          INTEGER(0..1023),
        sf2048                          INTEGER(0..2048),
        sf4096                          INTEGER(0..4096),
        sf8192                          INTEGER(0..8192)
    },
    ...
}

--- ASN1STOP
```

```
-- ASN1START

SCPTM-NeighbourCellList-r13 ::= SEQUENCE (SIZE (1..maxNeighCell-SCPTM-r13)) OF PCI-ARFCN-r13

PCI-ARFCN-r13 ::=               SEQUENCE {
    physCellId-r13                  PhysCellId,
    carrierFreq-r13                 ARFCN-ValueEUTRA-r9    OPTIONAL
}

-- ASN1STOP
```

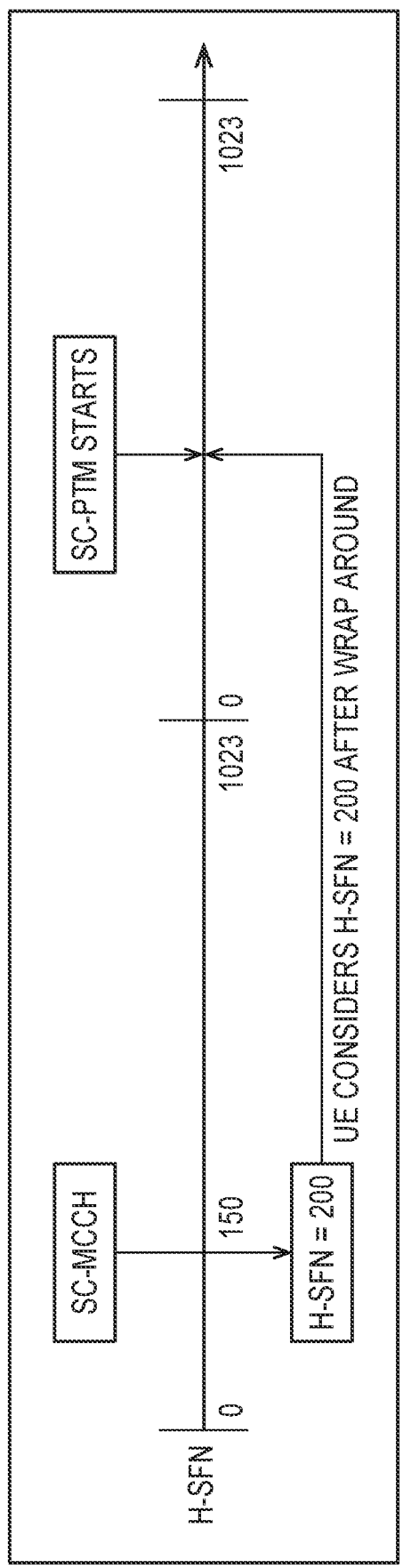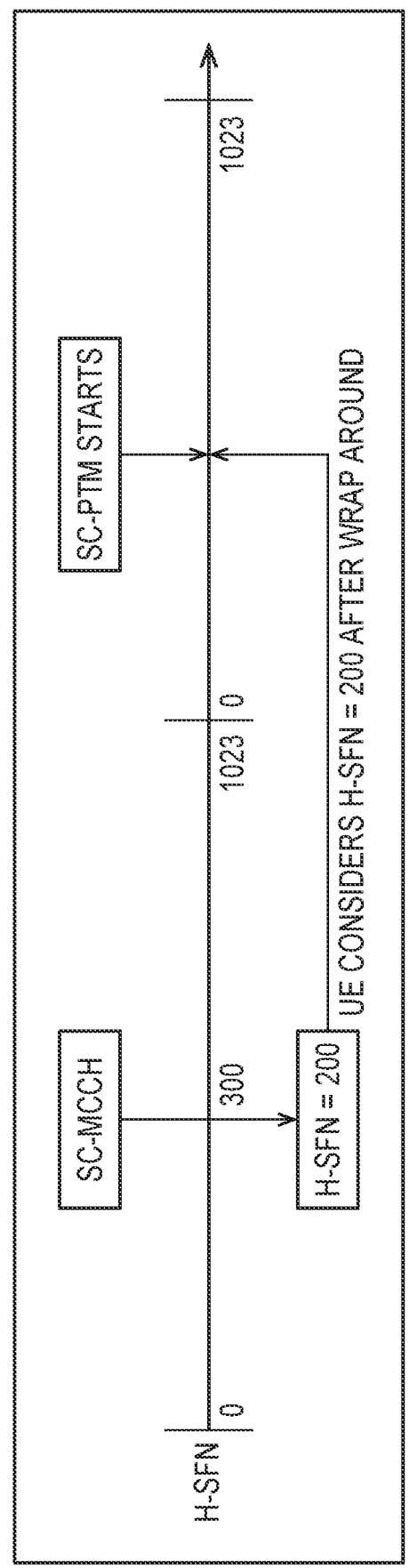

USER EQUIPMENT AND BASE STATION

CROSS-REFERENCE TO RELATED APPLICATION

The present application is a continuation based on PCT Application No. PCT/JP2017/028452 filed on Aug. 4, 2017, which claims the benefit of U.S. provisional application No. 62/372,919 (filed on Aug. 10, 2016). The content of which are incorporated by reference herein in their entirety.

FIELD

The present invention relates to a user equipment and a base station for a mobile communication system.

BACKGROUND

In 3GPP (Third Generation Partnership Project), which is a project aiming to standardize a mobile communication system, the specifications of MBMS (Multimedia Broadcast Multicast Service) have been laid out to provide a radio terminal with a multicast/broadcast service. As radio transmission schemes for MBMS, there are two schemes: MBSFN (Multicast Broadcast Single Frequency Network) transmission and SC-PTM (Single Cell Point-To-Multipoint) transmission. Since MBMS transmits the same data to a plurality of radio terminals using the same radio resource, the utilization efficiency of radio resources can be enhanced.

Meanwhile, radio terminals meant for MTC (Machine Type Communication) and IoT (Internet of Things) services, which perform communication without human intervention, have been studied. Such a radio terminal is required to achieve low cost, wide coverage area, and low power consumption. For this reason, in 3GPP, a new category for radio terminals having a transmission and reception bandwidth reduced to just a part of the system transmission and reception band is specified. However, at present, there is a problem that there is no mechanism for the radio terminals in the new category to efficiently receive multicast/broadcast services using MBMS.

SUMMARY

A user equipment according to a first aspect is a user equipment for a mobile communication system. The user equipment transmits and receives radio signals within a reduced bandwidth narrower than a system transmission and reception band. The user equipment performs radio communication with a base station by using the transceiver. The base station provides MBMS services via SC-PTM. The user equipment receives first information from the base station. The first information indicates at least one of: a maximum number of repetitions of a physical downlink control channel having a bandwidth equal to or less than the reduced bandwidth and a maximum number of repetitions of a physical downlink shared channel having a bandwidth equal to or less than the reduced bandwidth. The first information is transmitted from the base station by a system information block for the SC-PTM or a multicast control channel for the SC-PTM.

A base station according to a second aspect is a base station for a mobile communication system. The base station comprises a controller configured to provide Multimedia Broadcast Multicast Service (MBMS) services via Single Cell Point-To-Multipoint (SC-PTM) to a user equipment configured to transmit and receive radio signals within a reduced bandwidth narrower than a system transmission and reception band. The controller is configured to perform a process of transmitting first information to the user equipment. The first information indicates at least one of: a maximum number of repetitions of a physical downlink control channel having a bandwidth equal to or less than the reduced bandwidth and a maximum number of repetitions of a physical downlink shared channel having a bandwidth equal to or less than the reduced bandwidth. The first information is transmitted from the base station by a system information block for the SC-PTM or a multicast control channel for the SC-PTM.

BRIEF DESCRIPTION OF THE DRAWINGS

FIG. 9 is a diagram illustrating a downlink physical channel for category M1 according to the embodiment.

FIGS. 11A and 11B are diagrams illustrating Direct Indication according to the embodiment.

FIG. 12 is a diagram illustrating an SIB20 according to the embodiment.

FIG. 13 is a diagram illustrating SCPTM setting information (SCPTM Configuration) in SC-MCCH according to the embodiment.

FIGS. 14A and 14B are diagrams illustrating a provision start time expressed by H-SFN according to the embodiment.

DESCRIPTION OF THE EMBODIMENT (Mobile Communication System)

Figure 1:
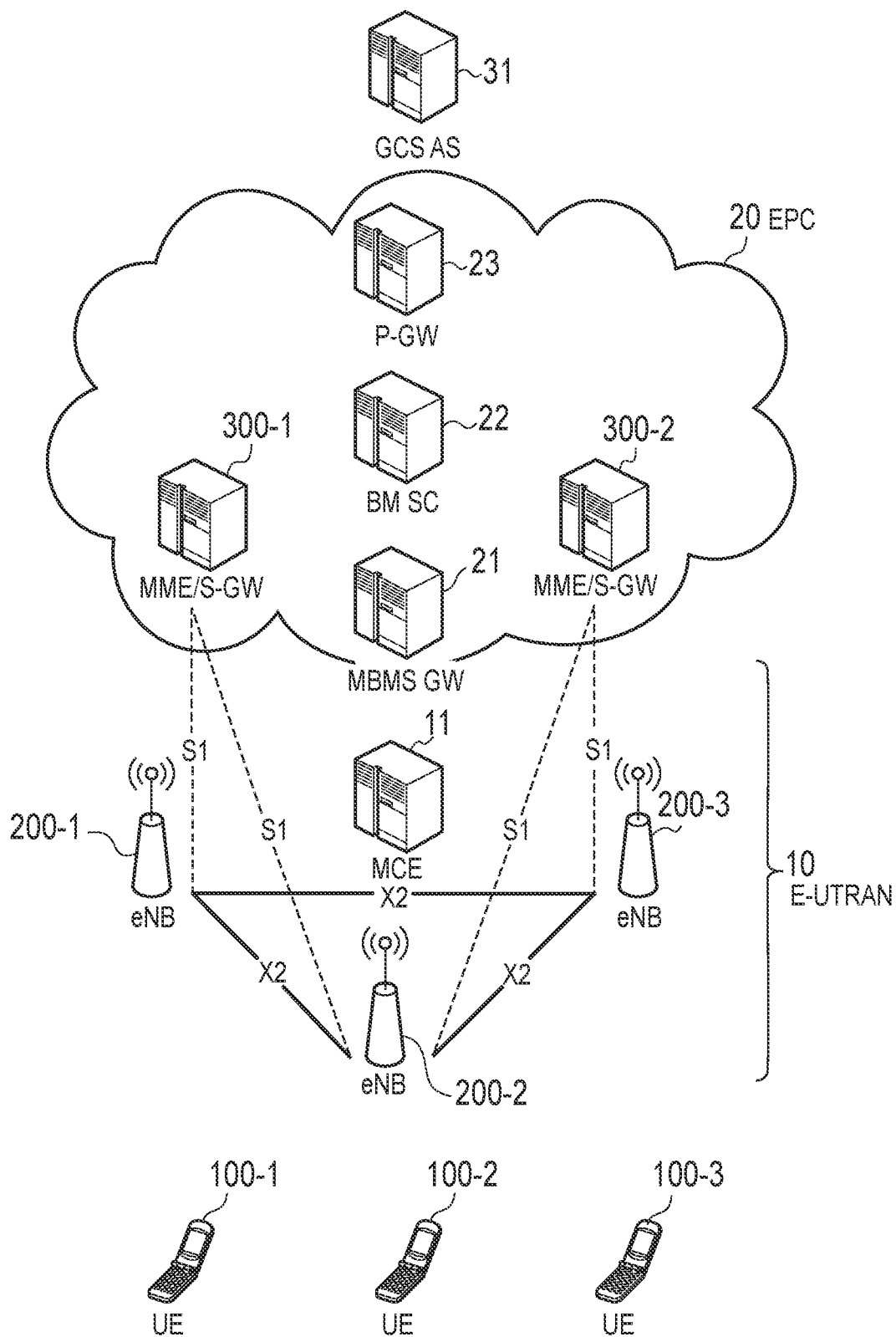
FIG. 1 is a diagram illustrating a configuration of an LTE system according to an embodiment.
Figure 2:
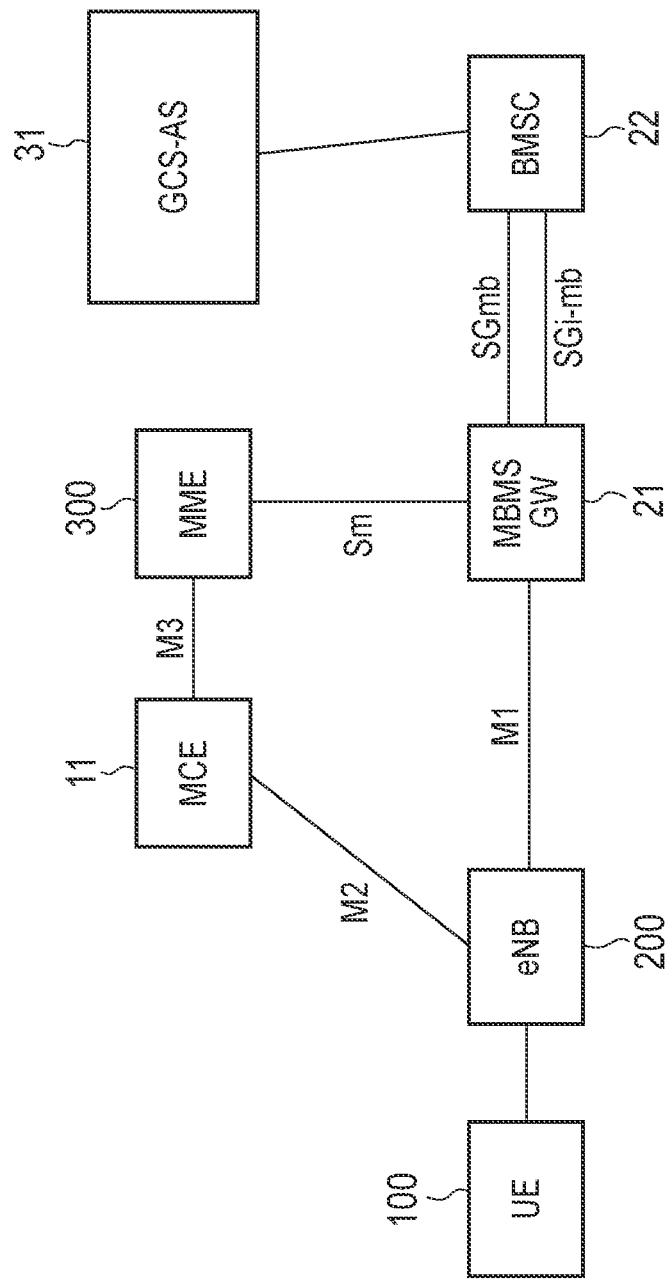
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface and is connected to the MME 300 via an M3 interface (see FIG. 2). The MCE 11 performs MBSFN radio resource management/allocation and the like. Specifically, the MCE 11 performs scheduling of MBSFN transmission. On the other hand, the scheduling of the SC-PTM transmission is performed by the eNB 200.

The EPC 20 includes an MBMS GW (MBMS Gateway) 21. The MBMS GW 21 is connected to the eNB 200 via an M1 interface, connected to the MME 300 via an Sm interface, and is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces and is connected to the P-GW 23 via an SGi interface (see FIG. 2). The BM-SC 22 manages and allocates TMGI (Temporary Mobile Group Identity) and the like.

A GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface, and is connected to the P-GW 23 via the SGi interface. The GCS AS 31 performs management of groups and data distribution etc. in group communication.

Figure 3:
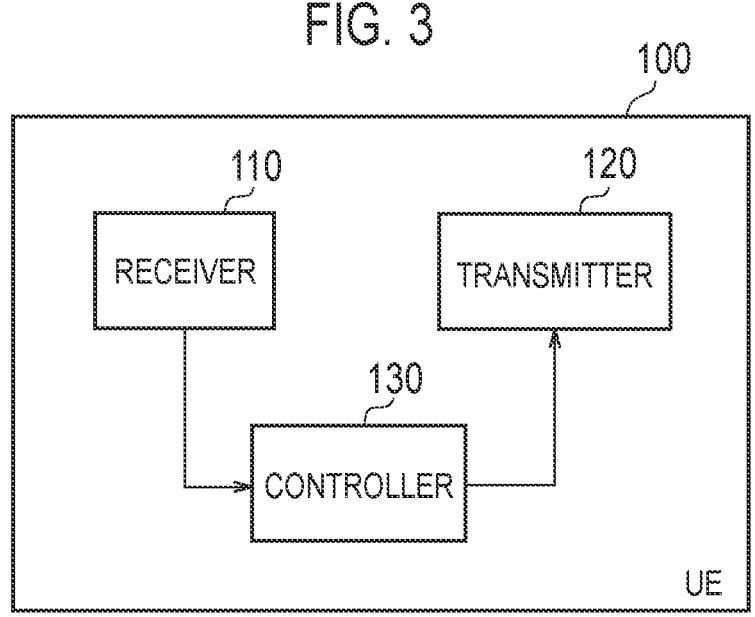
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal) and outputs it to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal and transmits it from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor may include a codec for encoding/decoding audio/video signals. The processor executes various processes to be described later.

Figure 4:
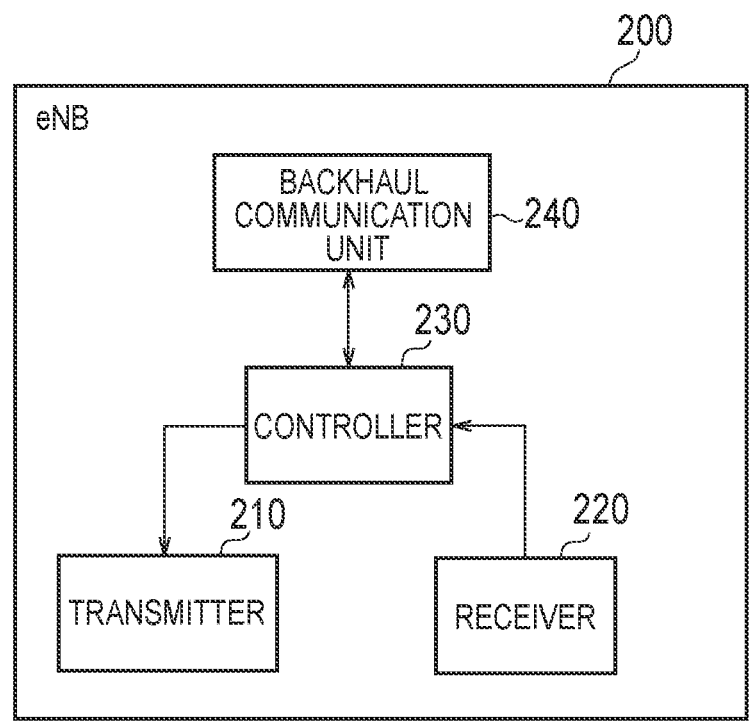
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal and transmits it from the antennas.

The receiver 220 performs various types of reception under the control of the controller 230. The receiver 220 includes antennas and a receiving machine. The receiving machine converts the radio signal received by the antennas into a baseband signal (received signal) and outputs it to the controller 230.

The controller 230 performs various controls in the eNB 200. The controller 230 includes a processor and a memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 5:
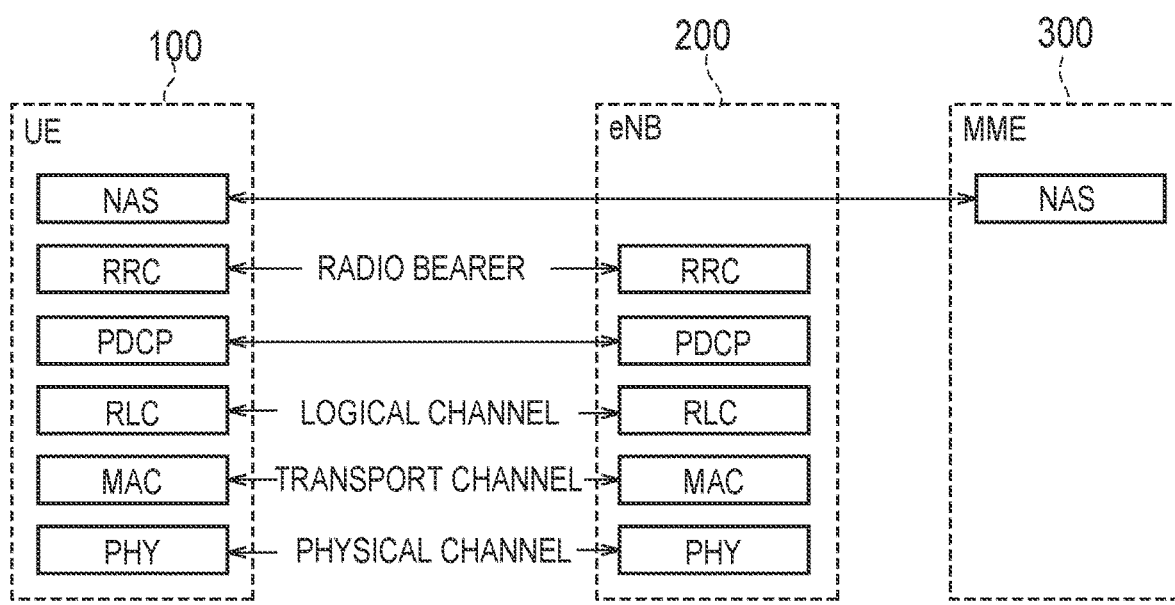
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various settings are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected mode, otherwise the UE 100 is in the RRC idle mode.

The NAS (Non-Access Stratum) layer located above the RRC layer performs session management, mobility management, and the like.

Figure 6A:
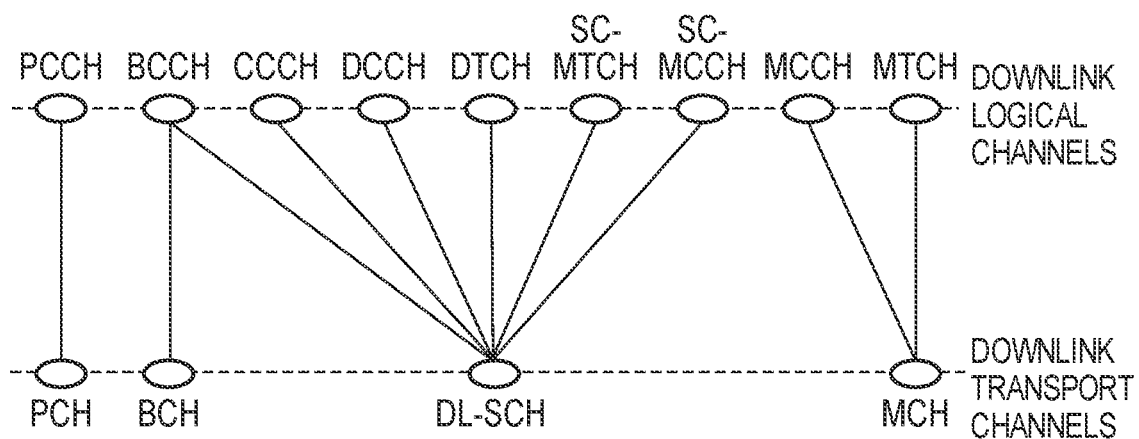
FIGS. 6A and 6B are diagrams illustrating a channel configuration of downlink of the LTE system according to the embodiment.
Figure 6B:
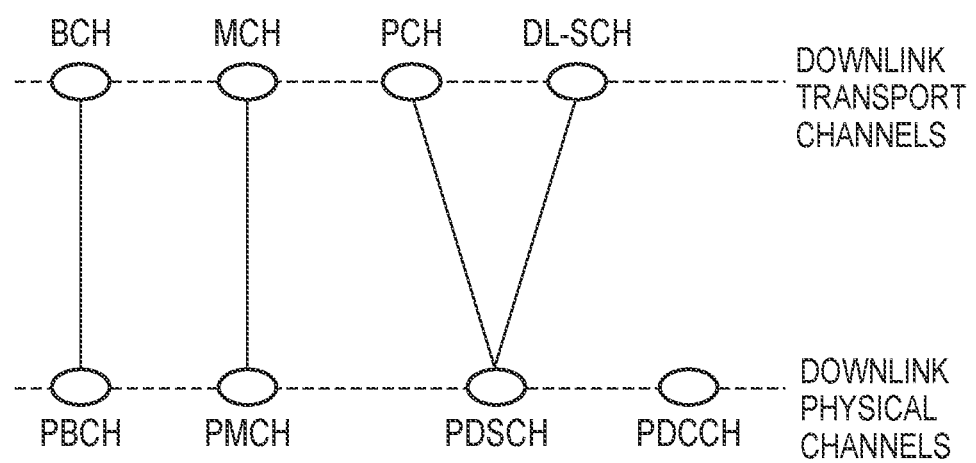

FIGS. 6A and 6B are diagrams illustrating a channel configuration of downlink of the LTE system. FIG. 6A illustrates mapping between a logical channel (Downlink Logical Channel) and a transport channel (Downlink Transport Channel).

As illustrated in FIG. 6A, a PCCH (Paging Control Channel) is a logical channel for notifying paging information and system information change. The PCCH is mapped to PCH (Paging Channel) that is a transport channel.

A BCCH (Broadcast Control Channel) is a logical channel for system information. The BCCH is mapped to BCH (Broadcast Control Channel) and DL-SCH (Downlink Shared Channel), both of which are transport channels.

A CCCH (Common Control Channel) is a logical channel for transmission control information between the UE 100 and the eNB 200. The CCCH is used if the UE 100 has no RRC connection with the network. The CCCH is mapped to the DL-SCH.

A DCCH (Dedicated Control Channel) is a logical channel for transmitting individual control information between the UE 100 and the network. The DCCH is used if the UE 100 has an RRC connection. The DCCH is mapped to the DL-SCH.

A DTCH (Dedicated Traffic Channel) is an individual logical channel for data transmission. The DTCH is mapped to the DL-SCH.

An SC-MTCH (Single Cell Multicast Traffic Channel) is a logical channel for SC-PTM transmission. The SC-MTCH is a point-to-multipoint downlink channel for transmitting data from the network to the UE 100 by using the SC-PTM transmission.

An SC-MCCH (Single Cell Multicast Control Channel) is a logical channel for SC-PTM transmission. The SC-MCCH is a point-to-multipoint downlink channel for transmitting MBMS control information for one or more SC-MTCHs from the network to the UE 100. The SC-MCCH is used for the UE 100 that is to receive MBMS using SC-PTM or that is interested in the reception. Further, there is only one SC-MCCH in one cell.

An MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

An MTCH (Multicast Traffic Channel) is a logical channel for MBSFN transmission. The MTCH is mapped to the MCH.

FIG. 6B illustrates mapping between a transport channel (Downlink Transport Channel) and a physical channel (Downlink Physical Channel).

As illustrated in FIG. 6B, the BCH is mapped to a PBCH (Physical Broadcast channel).

The MCH is mapped to a PMCH (Physical Multicast Channel). The MCH supports MBSFN transmission by a plurality of cells.

The PCH and the DL-SCH are mapped to a PDSCH (Physical Downlink Shared Channel). The DL-SCH supports HARQ, link adaptation, and dynamic resource allocation.

A PDCCH carries resource allocation information of the PDSCH (DL-SCH, PCH), HARQ information on the DL-SCH, and the like. Further, the PDCCH carries an uplink scheduling grant.

Figure 7:
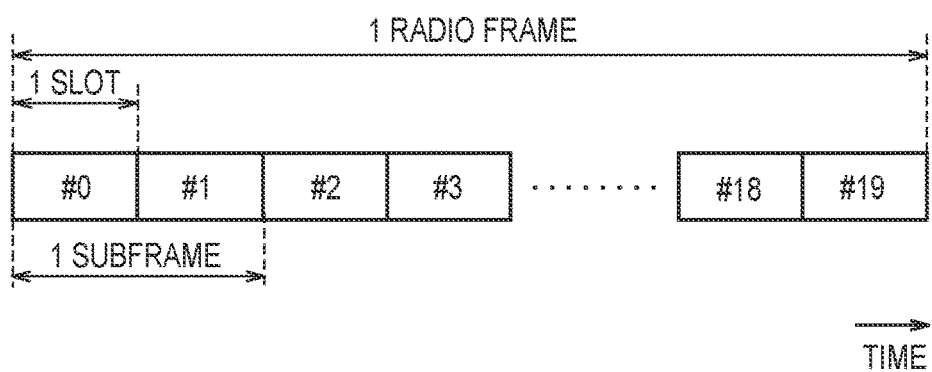
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 7, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a downlink control signal. Furthermore, the other portion of each subframe is a region available as a physical downlink shared channel (PDSCH) for mainly transmitting downlink data. Furthermore, in the downlink, an MBSFN subframe which is a subframe for MBSFN transmission may be set.

In the uplink, both ends in the frequency direction of each subframe are control regions used as a physical uplink control channel (PUCCH) for mainly transmitting an uplink control signal.

In the LTE system, Discontinuous Reception (DRX) may be set in the UE 100 to reduce power consumption. In the DRX operation, the UE 100 in the RRC idle mode monitors a paging message at a paging reception opportunity (Paging Occasion) occurring at a predetermined time interval (DRX cycle).

In the DRX operation, the UE 100 discontinuously monitors the PDCCH to receive the paging. The UE 100 decodes the PDCCH using a paging identifier (P-RNTI: Paging Radio Network Temporary Identifier) and acquires paging channel allocation information. The UE 100 acquires the paging message, based on the allocation information. A PDCCH monitoring timing in the UE 100 is determined, based on an identifier (IMSI: International Mobile Subscriber Identity) of the UE 100.

A PDCCH monitoring timing in the DRX operation (PDCCH monitoring subframe) is referred to as Paging Occasion (PO). The PO corresponds to the paging reception opportunity.

The UE 100 and the eNB 200 calculate the Paging Occasion (PO) and a Paging Frame (PF) which is a radio frame that may include the Paging Occasion, as follows.

A system frame number (SFN) of the PF is evaluated from the following equation (1).

$$\text{SFN mod } T = (T \text{ div } N)*(\text{UE\_ID mod } N) \quad (1)$$

Here, T is a DRX cycle of the UE 100 for monitoring the paging, and is represented by the number of radio frames. Further, T is the smaller one of the default DRX value broadcasted by the eNB 200 by an SIB (System Information Block) and the UE specific DRX value set to the UE 100 by an NAS message. When the UE specific DRX value is not set, the UE 100 applies the default DRX value. Further, N is a minimum value out of T and nB. nB is a value selected from 4T, 2T, T, T/2, T/4, T/8, T/16, and T/32. UE_ID is a value evaluated by "IMSI mod 1024".

From the PFs thus obtained, an index i_s is obtained by the following equation (2) and the subframe number of the PO corresponding to the index i_s is found.

$$i\_s = \text{floor}(\text{UE\_ID}/N) \text{mod } Ns \quad (2)$$

Here, Ns is a maximum value out of 1 and nB/T.

Next, extended DRX will be described. In the extended DRX, hyperframes are used to support very long DRX cycles.

Figure 8:
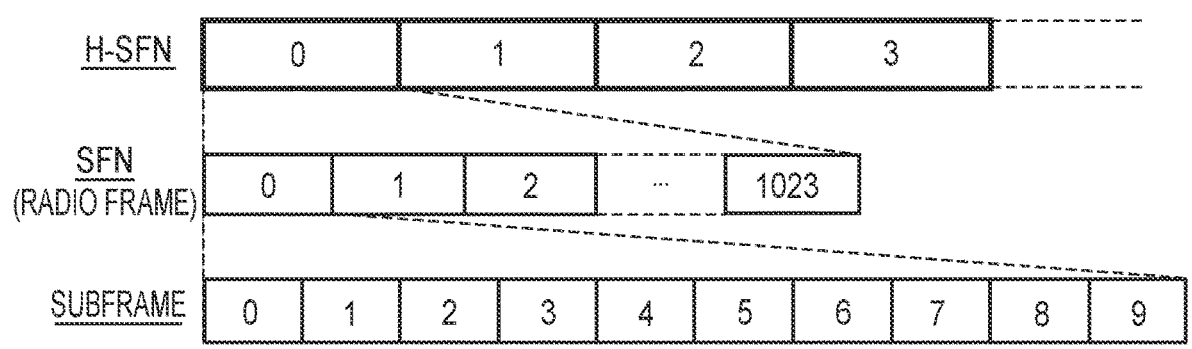
FIG. 8 is a diagram illustrating a relationship between a hyperframe, a radio frame, and a subframe according to the embodiment.

FIG. 8 is a diagram illustrating a relationship between a hyperframe, a radio frame, and a subframe. As illustrated in FIG. 8, the hyperframe is identified by H-SFN (Hyper System Frame Number). The H-SFN is informed from the cell. The radio frame is identified by SFN (System Frame Number). The subframe is identified by subframe number. One hyperframe is composed of 1024 radio frames. System frame numbers from 0 to 1023 are allocated to the 1024 radio frames. Further, one radio frame includes 10 subframes. Subframe numbers from 0 to 9 are allocated to the 10 subframes.

When system information indicates that the cell supports the extended DRX, the UE 100 in which the extended DRX cycle is set performs the extended DRX operation. The UE 100 performs the above-mentioned PO monitoring within a periodic paging window set in the UE itself. The paging window is specific to the UE. The paging window is defined by a paging hyperframe (PH), a start point (PW_start) in the PH, and an end point (PW_end) in the PH.

Here, the PH is H-SFN satisfying the following equation (3).

$$H\text{-SFN mod } T_{eDRX,H} = (\text{UE\_ID mod } T_{eDRX,H}) \quad (3)$$

UE_ID is "IMSI mod 1024". $T_{eDRX,H}$ is an extended DRX cycle (eDRX cycle) set in the UE 100.

PW_start indicates the first radio frame of the paging window, and is SFN satisfying the following equation (4).

$$\text{SFN} = 256 * i_{eDRX} \quad (4)$$

$i_{eDRX}$ is "floor(UE_ID/$T_{eDRX, H}$) mod 4".

PW_end indicates the last radio frame of the paging window and is SFN satisfying the following equation (5).

$$\text{SFN} = (\text{PW\_start} + L*100 - 1) \text{mod } 1024 \quad (5)$$

L is a paging window length set in the UE 100.

(Assumed Scenario)

An assumed scenario according to the embodiment will be described. In the embodiment, the assumed scenario is that a new category of UE 100 having a transmission and reception bandwidth reduced to just a part of the system transmission and reception band receives a multicast/broadcast service using MBMS. As such a scenario (use case), there is a case where batch distribution of firmware to a large number of UEs 100, which is an MBMS service, is performed.

The new UE category are referred to as category M1 and NB (narrow band)—IoT category. Category M1 reduces the transmission and reception bandwidth of the UE 100 to 1.08 MHz (that is, the bandwidth of six resource blocks) and supports the coverage enhancement (CE: Enhanced Coverage) technique using repetitive transmission and the like. NB-IoT category further reduces the transmission and reception bandwidth of the UE 100 to 180 kHz (that is, the bandwidth of one resource block) and supports the coverage enhancement technique. The repetitive transmission is a technique of repeatedly transmitting the same signal using a plurality of subframes. In the following, it is mainly assumed that the UE 100 is of category M1. However, it may be assumed that the UE 100 is of NB-IoT category. It is noted that it is assumed that such a UE 100 is set for eDRX in terms of power saving.

As an example, the system bandwidth of the LTE system is 10 Hz, of which the transmission and reception bandwidth is 9 MHz (that is, the bandwidth of 50 resource blocks). On the other hand, the UE 100 of the category M1 cannot receive a normal PDCCH because it cannot receive a downlink radio signal transmitted with a wider bandwidth than six resource blocks. For this reason, an MPDCCH (MTC-PDCCH) which is a PDCCH for MTC is introduced. For the same reason, an NPDCCH (NB-PDCCH) which is a PDCCH for NB-IoT is introduced.

FIG. 9 is a diagram illustrating a downlink physical channel for category M1. As illustrated in FIG. 9, the eNB 200 transmits an MPDCCH within six resource blocks. The MPDCCH includes scheduling information for allocating a PDSCH. As an example, the MPDCCH allocates a PDSCH of a subframe different from the subframe in which the MPDCCH is transmitted. The eNB 200 transmits the PDSCH within six resource blocks. Further, the eNB 200 allocates PDSCHs to a plurality of subframes in order to repeatedly transmit the same signal. The UE 100 of category M1 identifies the allocated PDSCH by receiving the MPDCCH and receives the data transmitted with the allocated PDSCH.

Next, the MBMS will be described. As radio transmission schemes for MBMS, there are two schemes: MBSFN transmission and SC-PTM transmission. In the MBSFN transmission, data is transmitted via the PMCH on an MBSFN area basis which is composed of a plurality of cells. By contrast, in the SC-PTM transmission, data is transmitted via the PDSCH on a cell basis. In the following, a scenario in which the UE 100 of category M1 or NB-IoT category performs SC-PTM reception is mainly assumed. However, MBSFN may be assumed.

The UE 100 may receive the MBMS service in the RRC connected mode. The UE 100 may receive the MBMS service in the RRC idle mode. In the following, the case where the UE 100 receives the MBMS service in the RRC idle mode is mainly assumed. It is noted that the RRC idle mode includes a suspend state. In the suspend state, since the context information of the UE 100 is maintained in the eNB 200, the RRC connection can be promptly restored.

Figure 10:
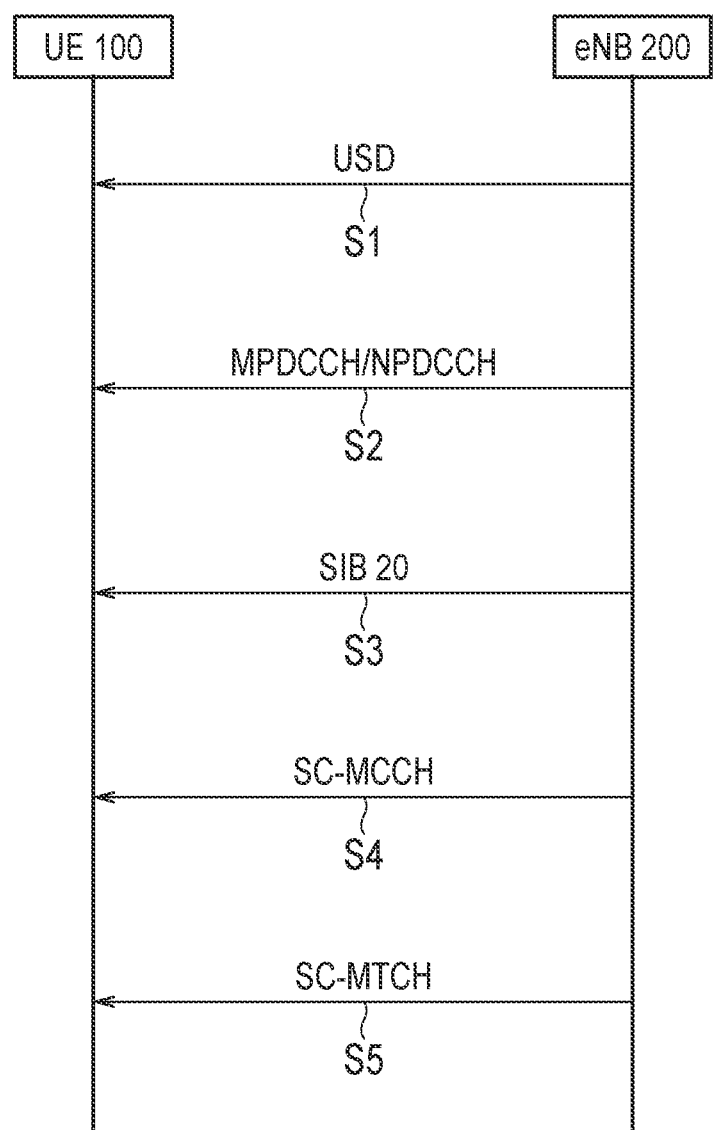
FIG. 10 is a diagram illustrating an example of an operation of SC-PTM reception performed by the UE according to the embodiment.

FIG. 10 is a diagram illustrating an example of an operation of SC-PTM reception performed by the UE 100 according to the embodiment. The UE 100 is a UE 100 of category M1 or NB-IoT category.

As illustrated in FIG. 10, in step S1, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S2, the UE 100 receives the MPDCCH or the NPDCCH from the eNB 200. Each of the MPDCCH and NPDCCH includes update notification information (Direct Indication) indicating update of system information (SIB: System Information Block). FIGS. 11A and 11B are diagrams illustrating the Direct Indication. FIG. 11A illustrates the Direct Indication in the MPDCCH, and FIG. 11B illustrates the Direct Indication in the NPDCCH. Based on the Direct Indication, the UE 100 recognizes that one of the pieces f system information has been updated and further receives SIB Type 1 (SIB1). The SIB1 includes a tag number (valueTag) indicating whether or not each SIB is updated. Based on the tag number, the UE 100 determines whether or not to update SIB type 20 (SIB20) which is an SIB for SC-PTM. Here, it is assumed that the SIB20 has been updated, and further explanation is provided. Since the SIB20 includes only the scheduling information of the SC-MCCH, its update is considered to be rare.

In step S3, the UE 100 receives the SIB20 from the eNB 200 via the BCCH. The SIB20 includes information (scheduling information) necessary for acquiring the SC-MCCH. FIG. 12 is a diagram illustrating the SIB20. As illustrated in FIG. 12, the SIB20 includes sc-mcch-ModificationPeriod that represents a cycle in which the content of the SC-MCCH can be changed, sc-mcch-RepetitionPeriod that represents a transmission (retransmission) time interval of the SC-MCCH in the number of radio frames, sc-mcch-Offset that represents a scheduled radio frame offset of the SC-MCCH, sc-mcch-Subframe that represents a subframe in which the SC-MCCH is scheduled, and so forth. An SC-MCCH (SCPTM Configuration) is transmitted in sc-mcch-RepetionPeriod (every up to 2,560 ms). The UE 100 acquires the SC-MCCH every sc-mcch-ModificationPeriod (up to 655,360 ms=about 10.92 minutes). This acquisition of the SC-MCCH makes it possible to increase the power consumption of the UE 100.

In step S4, the UE 100 receives SCPTM setting information (SCPTM Configuration) from the eNB 200 via the SC-MCCH, based on the SIB20. For the SC-MCCH transmission in the physical layer, an SC-RNTI (Single Cell RNTI) is used. FIG. 13 is a diagram illustrating SCPTM setting information (SCPTM Configuration) in the SC-MCCH. As illustrated in FIG. 13, the SCPTM setting information includes control information applicable to the MBMS service, which is transmitted via SC-MRB (Single Cell MBMS Point to Multipoint Radio Bearer). The SCPTM setting information includes sc-mtch-InfoList containing setting for each SC-MTCH in the cell transmitting that information, and scptmNeighbourCellList which is a list of neighbour cells providing the MBMS service via the SC-MRB. sc-mtch-InfoList contains one or more pieces of SC-MTCH-Info. Each piece of SC-MTCH-Info contains information on an ongoing MBMS session (mbmsSessionInfo) to be transmitted via the SC-MRB, a G-RNTI (Group RNTI) corresponding to the MBMS session, and sc-mtch-schedulingInfo which is DRX information for the SC-MTCH. mbmsSessionInfo contains a TMGI and a session ID (sessionId) that identify the MBMS service. The G-RNTI is an RNTI that identifies a multicast group (specifically, an SC-MTCH addressed to a specific group). The G-RNTI is mapped to the TMGI on a one-to-one basis.

sc-mtch-schedulingInfo contains onDurationTimerSCPTM, drx-InactivityTimerSCPTM, and schedulingPeriodStartOffsetSCPTM. schedulingPeriodStartOffsetSCPTM contains SC-MTCH-SchedulingCycle and SC-MTCH-SchedulingOffset. Now, DRX for SC-PTM transmission will be described. The DRX for SC-PTM transmission is an operation independent of the DRX described above. The UE 100 in which the DRX for SC-PTM transmission has been set intermittently monitors the PDCCH using the corresponding G-RNTI in the RRC connected mode or the RRC idle mode. If onDurationTimerSCPTM or drx-InactivityTimerSCPTM is in operation (running), the active time is on. The UE 100 monitors the PDCCH during the active time. Further, if "[(SFN*10)+subframe number] modulo (SC-MTCH-SchedulingCycle)=SC-MTCH-Scheduling Offset" is satisfied, the UE 100 starts onDurationTimerSCPTM. If the PDCCH indicates DL transmission, the UE 100 starts the drx-InactivityTimerSCPTM.

In step S5, the UE 100 receives the MBMS service (data) corresponding to the TMGI, in which the UE 100 itself is interested, via the SC-MTCH, based on SC-MTCH-SchedulingInfo in the SCPTM setting information (SCPTM Configuration). In the physical layer, after transmitting the PDCCH using the G-RNTI, the eNB 200 transmits data via the PDSCH. The UE 100 attempts to receive the data every at most 8192 ms. This data reception may increase the power consumption of the UE 100.

(Operation Pattern)

An operation pattern according to the embodiment will be described. As a premise, the UE 100 includes a transceiver (the receiver 110 and the controller 130) configured to transmit and receive a radio signal within a reduced bandwidth narrower than the system transmission and reception band, and the controller 130 that performs a radio communication with the eNB 200 using the transceiver. The reduced bandwidth is, for example, 1.08 MHz (that is, the bandwidth of six resource blocks) for the UE 100 belonging to the M1 category, and 180 kHz (that is, the bandwidth of one resource block) for the UE 100 belonging to the NB-IoT category. The controller 130 performs processing of receiving, from the eNB 200 within the reduced bandwidth, information necessary for receiving a multicast/broadcast service (MBMS service) provided via the eNB 200.

(1) Operation Pattern 1

As described above, when the UE 100 of category M1 or the NB-IoT category performs the SC-PTM reception, the power consumption of UE 100 is increased. In particular, assuming a case where the UE 100 is set fro the eDRX, there is a concern that sufficient power consumption reduction effect cannot be obtained due to wakeup related to the SC-PTM reception. Therefore, it is desirable that the UE 100 can perform the SC-PTM reception while an increase in its power consumption is suppressed.

In operation pattern 1, the UE 100 is provided with a predetermined storage medium for storing a preset service identifier (TMGI). As an example, the predetermined storage medium is a UICC (Universal Integrated Circuit Card). The preset service identifier is a service identifier dedicated to a specific MBMS service. The specific MBMS service may be a firmware distribution service.

As a result, the UE 100 can confirm that the specific MBMS service is provided from the eNB 200 just by looking at the SC-MCCH provided from the eNB 200

(serving cell), without acquiring the USD by unicast. Therefore, the UE 100 in the RRC idle mode does not have to make a transition to the RRC connected mode only in order to acquire the USD. Further, the UE 100 may receive the SC-MCCH at the time of wakeup (paging confirmation) of the eDRX.

(2) Operation Pattern 2

As described above, after receiving the update notification information (Direct Indication) in the MPDCCH or the NPDCCH, the UE 100 cannot recognize the update of the SIB20 unless the UE 100 receives and confirms the tag number (valueTag) in the SIB1. Such processing for receiving and confirming the tag number increases the power consumption of the UE 100.

In operation pattern 2, the UE 100 receives the update notification information (Direct Indication) from the eNB 200 on a predetermined physical downlink control channel (MPDCCH or NPDCCH) having a bandwidth equal to or less than the reduced bandwidth. The update notification information includes at least one of; a first update notification indicating update of the system information block (SIB20) for SC-PTM; a second update notification indicating update of the multicast control channel (SC-MCCH) for SC-PTM; and a third update notification indicating update related to a specific MBMS service indicated in the multicast control channel (SC-MCCH) for SC-PTM. Each of the first to third update notifications may be defined as a 1-bit flag. The update notification information (Direct Indication) may use an existing format or may define a new format (a new PDCCH format).

The first update notification is an update notification by the SIB20 alone. In response to the update notification information (Direct Indication) in the MPDCCH or NPDCCH including the first update notification, the UE 100 can recognize the update of the SIB20 even without receiving the SIB1.

The second update notification is an update notification of SC-MCCH (that is, SCPTM Configuration). The eNB 200 may transmit the second update notification to the UE 100 by the MPDCCH or the NPDCCH which is scrambled with an SC-N-RNTI. In response to the update notification information (Direct Indication) in the MPDCCH or NPDCCH including the second update notification, the UE 100 can recognize the update of SC-MCCH.

The third update notification is an update notification on specific SC-MTCH-Info in sc-mtch-InfoList in the SC-MCCH. The specific SC-MTCH-Info is associated with a specific MBMS service (for example, a firmware distribution service). Specifically, the specific SC-MTCH-Info includes a TMGI (service identifier) that identifies a specific MBMS service. In response to the update notification information (Direct Indication) in the MPDCCH or NPDCCH including the third update notification, the UE 100 can recognize the update of the specific SC-MTCH-Info even without receiving the SC-MCCH. In a case where each update of a plurality of MBMS services can be noticed, two or more bits in the update notification information (Direct Indication) may be assigned to the third update notification. The position of each bit is associated with the MBMS service (specifically, SC-MTCH-Info). The correspondence between the bit position and the MBMS service may be set by an SIB or the like from the eNB 200 to the UE 100. In this case, based on the bit position of the third update notification in the update notification information (Direct Indication), the UE 100 checks which SC-MTCH-Info in sc-mtch-InfoList in the SC-MCCH has been updated.

When the second and third update notifications are not provided, the UE 100 receives the SC-MCCH every SC-MCCH modification boundary or every time the UE 100 receives the PDCCH scrambled with the SC-N-RNTI, and the UE 100 may then check whether or not the setting (SC-MTCH-Info) related to a TMGI of interest has been updated.

(3) Operation Pattern 3

Operation pattern 3 is an operation pattern for directly notifying the UE 100 of start of distribution of a specific MBMS service.

In operation pattern 3, the UE 100 receives a paging message from the eNB 200 on the PDSCH having a bandwidth equal to or less than the reduced bandwidth. The paging message includes a service identifier (TMGI) of the specific MBMS service. The paging message may include a list of a plurality of service identifiers (TMGIs). As a result, the UE 100 recognizes that distribution of the specific MBMS service is started, and can start processing for receiving the specific MBMS service. Therefore, it is possible to keep wakeup of the UE 100 to the minimum necessary. It is noted that the general paging message does not include the service identifier (TMGI), but includes the identifier (IMSI etc.) of the UE 100 to be called.

The eNB 200 specifies the PDSCH (narrowband PDSCH) that carries the paging message by the MPDCCH or the NPDCCH which is scrambled with the P-RNTI. Then, the eNB 200 transmits the paging message with the specified PDSCH. The UE 100 recognizes the PDSCH (narrowband PDSCH) that carries the paging message by receiving the MPDCCH or the NPDCCH which is scrambled with the P-RNTI. Then, the UE 100 receives the paging message with the recognized PDSCH. The UE 100 may check whether or not the preset service identifier (TMGI) described in operation pattern 1 is indicated in the paging message.

When the UE 100 desires to receive the MBMS service identified by the service identifier (TMGI) included in the paging message, the UE 100 may establish an RRC connection with the eNB 200. In this case, the UE 100 may transmit an RRC Connection Request message to the eNB 200, or may send an RRC Resume Request message to the eNB 200 in the suspended state. Alternatively, the UE 100 may acquire the SIB20 and/or the SC-MCCH instead of establishing the RRC connection, and then attempt to receive the SC-PTM as transmitted.

(4) Operation Pattern 4

In operation pattern 4, the UE 100 receives, from the eNB 200, time information indicating at least one of a time at which provision of the specific MBMS service is started and a time at which the provision is ended. The time information is transmitted from the eNB 200 by the system information block (SIB20) for SC-PTM or the multicast control channel (SC-MCCH) for SC-PTM. The SIB20 or the SC-MCCH (SCPTM Configuration) may include a list consisting of a plurality of service identifiers (TMGIs) and pieces of time information of the respective service identifiers (TMGIs). As a result, it is possible to notify the UE 100 of the start time or the like for each TMGI. Therefore, the UE 100 can maintain a sleep state until provision of the MBMS service (for example, an MBMS service identified by the preset service identifier) in which the UE 100 itself is interested is started.

The time information may be a combination of the provision start time and the provision end time. Alternatively, the time information may be a combination of the provision start time and the provision duration (for example, 1 minute). The provision start time (and the provision end time) may be expressed by H-SFN or may be expressed by UTC (Coordinated Universal Time).

In the case of H-SFN expression, the UE 100 recognizes that the H-SFN indicating the provision start time is the H-SFN after the wrap around (#1023→#0). FIGS. 14A and 14B are diagrams is a diagram illustrating the provision start time expressed by the H-SFN. FIG. 14A illustrates a case where the provision start time in the SC-MCCH is expressed as H-SFN=200 at the time of H-SFN=150 in the UE 100. In this case, the UE 100 considers that provision of the MBMS service is started at the H-SFN=200 after the wrap around (#1023→#0). FIG. 14B illustrates a case where the provision start time in the SC-MCCH is expressed as H-SFN=200 at the time of H-SFN=300 in the UE 100. In this case, the UE 100 considers that provision of the MBMS service is started at the H-SFN=200 after the wrap around (#1023→#0). Defining such a rule makes it possible to prevent a mismatch in interpretation of the provision start time between the UE 100 and the network. As such a rule, there may be a rule that "the UE 100 have to understand as the provision start timing the specified H-SFN which is the H-SFN after the wrap around (after the upper limit is reached)". In the same way of thinking, using the modification boundary of the SC-MCCH or the SIB instead of the upper limit of the H-SFN, the provision may be started with the H-SFN corresponding to the timing of the next modification boundary to the modification boundary of the SC-MCCH or the SIB and later.

On the other hand, in the case of UTC expression, there might be a case where the UE 100 does not include a GPS or the like and thus cannot confirm the current UTC. However, if the current UTC is provided in SIB type 16 (SIB16), the UE 100, even if having no GPS or the like, can confirm UTC. Therefore, the eNB 200 may provide the provision start time expressed by UTC to the UE 100 only when the eNB 200 itself transmits the SIB16.

(5) Operation Pattern 5

As described above, repetitive transmission can be applied to the MPDCCH (or NPDCCH) and the PDSCH (narrowband PDSCH) for the purpose of coverage enhancement (CE). When the repetitive transmission is applied, the UE 100 preferably knows the maximum number of repeated transmissions and the actual number of repeated transmissions.

In operation pattern 5, the UE 100 receives, from the eNB 200, repetition number information that indicates at least one of; the number of repeated transmissions of a predetermined physical downlink control channel (MPDCCH or NPDCCH) having a bandwidth equal to or less than the reduced bandwidth; and the number of repeated transmissions of a physical downlink shared channel (narrowband PDSCH) having a bandwidth equal to or less than the reduced bandwidth. The repetition number information indicates at least one of the maximum number of repeated transmissions and the actual number of repeated transmissions. The repetition number information is transmitted from the eNB 200 by the system information block (SIB20) for SC-PTM or the multicast control channel (SC-MCCH) for SC-PTM.

Figure 15A:
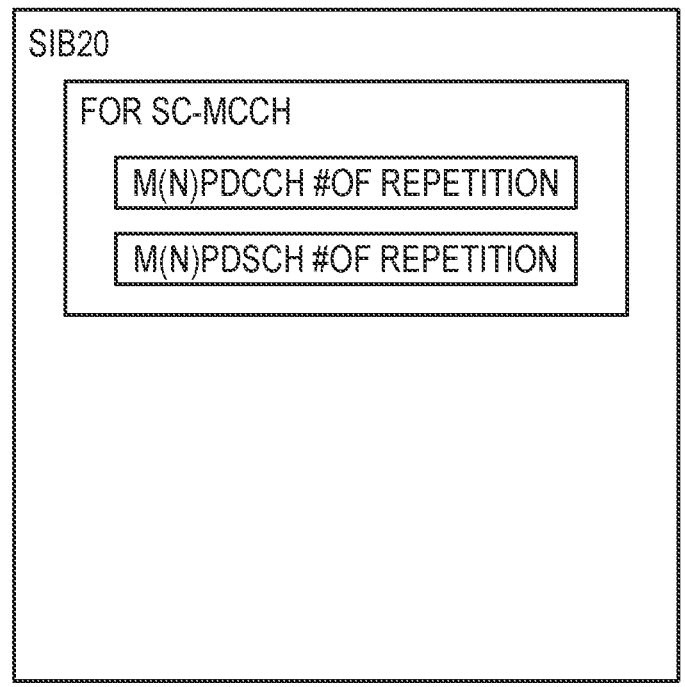
FIGS. 15A and 15B are diagrams illustrating repetition number information according to the embodiment.
Figure 15B:
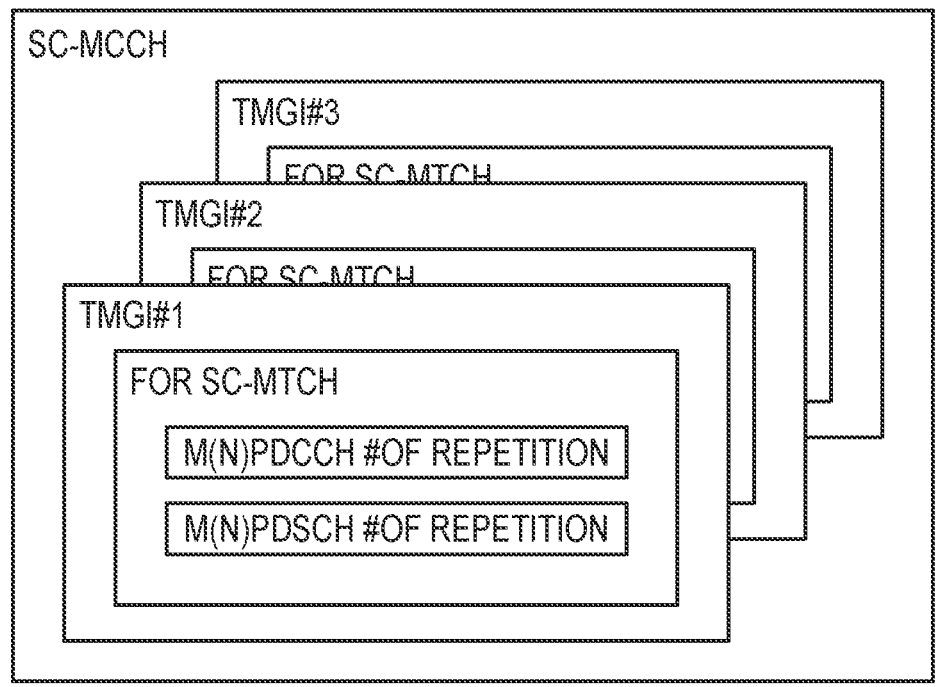

FIGS. 15A and 15B are diagrams is a diagram illustrating the repetition number information. FIG. 15A illustrates a case where the repetition number information (#of repetition) is provided in the SIB20. As illustrated in FIG. 15A, the eNB 200 provides the repetition number information of the MPDCCH (or NPDCCH) corresponding to the SC-MCCH and the repetition number information of the narrowband PDSCH corresponding to the SC-MCCH in the SIB20. Even when the repetitive transmission is applied to the SC-MCCH, the UE 100 can appropriately receive the SC-MCCH based on the repetition number information in the SIB20. FIG. 15B illustrates a case where the repetition number information (#of repetition) is provided in the SC-MCCH. As illustrated in FIG. 15B, the eNB 200 provides the repetition number information of the MPDCCH (or NPDCCH) corresponding to the SC-MTCH and the repetition number information of the narrowband PDSCH corresponding to the SC-MTCH in the SC-MCCH. Here, an example is illustrated in which the repetition number information is provided for each MBMS service (TMGI). The UE 100 can appropriately receive the SC-MTCH based on the repetition number information in the SC-MCCH.

(6) Operation Pattern 6

The UE 100 may move from one cell to another during SC-PTM reception. In such a case, it is desirable that the SC-PTM reception can be continued.

In operation pattern 6, the UE 100 receives a group RNTI (G-RNTI) associated with MBMS services provided by neighbour cells adjacent to the serving cell managed by the eNB 200, from the eNB 200 via the serving cell. That is, the UE 100 receives the G-RNTI used by the neighbour cell from the serving cell. That G-RNTI is transmitted from the eNB 200 (serving cell) by the system information block (SIB20) for SC-PTM or the multicast control channel (SC-MCCH) for SC-PTM.

In addition to the G-RNTI, the eNB 200 (serving cell) may provide the UE 100 with the SC-MTCH scheduling information (sc-mtch-schedulingInfo) of the neighbour cell. Alternatively, the eNB 200 (serving cell) may provide the SC-MCCH information (SCPTM Configuration) of all the neighbour cells to the UE 100. As a result, even when the UE 100 moves from the serving cell to a neighbour cell, the UE 100 can quickly receive the SC-MTCH of the neighbour cell. It is noted that the eNB 200 (serving cell) may provide at least a part of the SIB20 of the neighbour cell to the UE 100.

(7) Operation Pattern 7

The UE 100 does not necessarily succeed in receiving the MBMS service (data) transmitted on the SC-MTCH. Assuming a firmware distribution service, data (firmware) missing, even partly, is a problem.

In operation pattern 7, the UE 100 establishes an RRC connection in response to failed reception of the MBMS service in a state where the UE 100 has no RRC connection with the eNB 200 (that is, in the RRC idle mode), and transmits information related to the MBMS service corresponding to the failed reception to the eNB 200. As a result, it is possible to urge the eNB 200 to perform unicast retransmission of the MBMS service.

In operation pattern 7, the eNB 200 buffers the MBMS service (data) that has been transmitted on the SC-MTCH for a certain period of time. The eNB 200 may set a timer value related to the time to buffer the data in the UE 100 by an SIB or the like. The timer value defines an allowable time from when the UE 100 fails to receive the SC-MTCH to when the UE 100 establishes an RRC connection (for example, transmits an RRC Connection Request message). When failing the reception, the UE 100 has to activate a timer that sets the timer value and transmit the RRC Connection Request message (or an RRC Connection Resume message) before the timer expires. The eNB 200 activates the timer for each SC-MTCH transmission or buffering, and discards the buffered data when the timer expires.

After making a transition to the RRC connected mode, the UE 100 that has failed to receive the MBMS service may notify the eNB 200 of at least one of the following information.

Information that SC-PTM reception failed
TMGI whose reception failed
The first packet number whose reception failed (PDCP sequence number etc.)
HARQ process ID whose reception failed Here, notifying the packet number and/or the HARQ process ID enables the eNB 200 not to retransmit the entire MBMS service (data) by unicast but to retransmit only the data after the moment the UE 100 fails to receive. As a result, the UE 100 can utilize the data normally received by multicast.

When performing unicast retransmission, the eNB 200 may notify the UE 100 of at least one of the following information.

ID of retransmission bearer
PDCP sequence number of retransmission start packet
HARQ process ID It is noted that an example in which the UE 100 transmits an RRC Connection Request message in response to failed reception of the MBMS service has been described; however, the example does not limit that transmission, and feedback information indicating failed reception of the SC-MTCH may be transmitted. That feedback information may be a retransmission control signal (ACK or NACK) or the like.

Other Embodiments

Each of the above-described operation patterns is not limited to independent implementation; a combination of two or more of the operation patterns may be implemented. For example, a part of processing according to one operation pattern may be added to another operation pattern. Alternatively, a part of the processing according to one operation pattern may be replaced with a part of the configuration of another operation pattern.

In the embodiment described above, a firmware distribution is assumed as the MBMS service. However, MBMS services, such as distribution of group messages, distribution of group chat messages, distribution of virus definition files, regular distribution of update files such as weather forecast, irregular distribution of files such as news bulletin, night distribution of files such as video contents (off peak distribution), audio/video streaming distribution, telephone/video phone (group communication), live video distribution, and radio audio distribution, may be assumed.

In the above-described embodiment, the LTE system is exemplified as the mobile communication system. However, the present invention is not limited to the LTE system. The present invention may be applied to a mobile communication system other than the LTE system.

(Supplementary Note)
(1. Introduction)
In this supplementary note, the general issues to enhance the existing multicast mechanism for FeMTC UEs are discussed.
(2. Discussion)
(2.1. Rel-13 SC-PTM)
The SC-PTM was specified on top of the eMBMS architecture to support DL multicast transmission in a single cell using PDSCH, unlike MBSFN with PMCH. The PDSCH-based multicast mechanism allows dynamic scheduling by PDCCH scrambled with SC-RNTI or G-RNTI, which also well matches with the objective of this WI, i.e., "for machine-type communications for BL/CE (eMTC) UEs", although MPDCCH has not supported SC-RNTI, SC-N-RNTI and G-RNTI in Rel-13.

Observation 1: Rel-13 SC-PTM potentially supports 6 PRBs operation, although MPDCCH needs the RNTIs for SC-PTM transmission.

Before the UE receives DL multicast data, it needs to acquire SIB20 to know the occasions of SC-MCCH transmission, wherein SC-MCCH conveys the detailed information for SC-PTM reception, i.e., SC-MTCH-InfoList, such as TMGI, corresponding G-RNTI, SC-PTM scheduling information and so on.

The current upper bound of SC-MCCH modification period is about 10.92 minutes, i.e., rf65536. So, the UE interested in SC-PTM needs to check whether the contents of SC-MCCH has changed at least once every 10.92 minutes even if it has already received the current SC-MCCH, i.e., to try receiving the SC-MCCH change notification (PDCCH scrambled with SC-N-RNTI). On the other hand, Rel-13 eDRX extends the idle mode DRX cycle up to 43.69 munities. While it could be assumed that FeMTC UEs are configured with the eDRX cycle, if the UE is interested in SC-PTM reception then it may not take the full benefit of eDRX from the power saving point of view.

The UE monitors the SC-RNTI in the PDCCH to obtain the SC-MCCH transmission in the DL-SCH. The SC-MCCH provides the list of all MBMS services with on-going sessions transmitted on SC-MTCH(s), including for each MBMS service TMGI and optional session ID, associated G-RNTI and scheduling information. When the TMGI of interest is available in SC-MCCH, the UE monitors PDCCH scrambled with G-RNTI, i.e., SC-PTM, in the subframe occasions. The current scheduling period of SC-PTM is defined up to 8,192 ms, i.e., sf8192, so the UE needs to decode PDCCH once every 8 seconds, which is much shorter period compared to the eDRX cycle.

Observation 2: The IDLE UE interested in SC-PTM reception may need to decode PDCCH scrambled with SC-N-RNTI and/or G-RNTI in shorter period than its configured eDRX cycle.

In order to avoid the additional power consumption of FeMTC UEs, it should be discussed that the SC-MCCH change notification mechanism and/or SC-PTM scheduling period needs to be extended, e.g., to align with eDRX mechanisms using H-SFN.

Proposal 1: RAN2 should discuss whether the SC-MCCH change notification and SC-PTM scheduling period are extended, in order to minimize the UE power consumption.

(2.2. Rel-14 Multicast Requirements)
(2.2.1. Support of Firmware Update Use Case)
The WID identifies the motivation of DL multicast for FeMTC UEs, "e.g. firmware or software updates, group message delivery". It would require more reliable communication compared to the group communication and video streaming that were assumed as main applications in the legacy eMBMS, i.e., the firmware makes no sense even if only one packet is missed.

Regarding the unicast transmissions, HARQ and ARQ functionalities ensured the reliable packet transfer which could match the required QoS of e.g., firmware update case. However, considering the massive number of connections expected for IoT devices in the near future, it could no longer make sense that the reliable communication only relies on the unicast (and possibly on a robust network deployment).

On the other hand, the multicast transmissions could provide a data transfer to multiple UEs simultaneously, which is beneficial to serve massive number of devices in a cell. However, the existing multicast scheme is not robust enough for some cases since there is no protocol support for the packet failed to decode.

Observation 3: The unicast transmission could ensure the reliable data transfer for e.g., firmware, while the multicast transmission could serve more number of UEs, massive MTC devices.

There are three approaches for the enhancements, a) a combination of unicast and multicast, b) enhancements to unicast and c) enhancements to multicast, whereby only a) and c) are in-line with the scope of WI.

Regarding a), it could be considered that the UE, which fails the integrity check of a file downloaded via multicast, would be expected to reacquire the file via unicast by e.g., an upper layer-initiated retransmission request. While it's simple mechanism from the AS specification point of view, there could be some drawbacks from the perspective of UE power consumption. For example, the UE may need to reacquire whole the file even if a part of packets is not successfully decoded, wherein it's not efficient especially if the file is not small size, e.g., firmware/software. Additionally, if the UE was in IDLE, i.e., idle mode reception of multicast, then it needs to establish RRC connection for the unicast transfer, wherein it takes additional signaling for connection establishment/resumption.

Regarding c), it may be one of the approaches to introduce the retransmission scheme in AS specifications for multicast. It needs the standardization efforts for e.g., UL feedback and/or retransmission mechanisms, while it would improve the efficiency of FeMTC UEs to download the firmware completely. Considering that low power consumption is key performance of MTC devices, the retransmission scheme should be considered for DL multicast.

Proposal 2: RAN2 should discuss whether the retransmission scheme, including UL feedback, should be introduced in SC-PTM for FeMTC UEs.

(2.2.2. Support of Enhanced Coverage)

Currently, pre-Rel-14 UEs in Connected and IDLE are able to receive MBMS services. Since Rel-14 UEs are assumed to be in Enhanced Coverage, the principle of current multicast mechanism should be applied.

Proposal 3: Rel-14 UEs in Connected and IDLE should also be able to receive SC-PTM in Enhanced Coverage.

The repetition of signals was a key component to support Coverage Enhancements in Rel-13, in addition to the bandwidth reduced access technology. The repetition technique could be considered to be reused for Rel-14 multicast to UEs in Enhanced Coverage. From RAN2 point of view, at least BCCH (SIB20) and DL-SCH (SC-MCCH and SC-PTM) should be considered and the (maximum) number of repetitions for these channels are already provided by RRC, i.e., pdsch-maxNumRepetitionCEmodeA, pdsch-maxNumRepetitionCEmodeB and mpdcch-NumRepetition and MPDCCH provides actual number of PDSCH repetition, while mpdcch-NumRepetition for SC-MCCH/SC-PTM transmissions may need to be provided in SIB for IDLE UEs if MPDCCH is used to assign the corresponding PDSCHs. In addition, the repetition of SC-MCCH is already provided in SIB20, i.e., sc-mcch-RepetionPeriod-r13, in order to limit the access latency. It may be also reused to support Enhanced Coverage. If RAN2 agrees these changes are needed, RAN1 should also be informed about RAN2's views.

Observation 4: The repetition technique should be reused for multicasting in Enhanced Coverage.

Proposal 4: If RAN2 agrees with Observation 4, an LS should be send to RAN1 to inform them of desired changes.

According to the current idle mode procedure, the UE receiving or interested in an MBMS service may prioritize the frequency providing SC-PTM over the other frequencies, i.e., to consider the highest priority. On the other hand, it's also specified that "Ranking with cell selection criterion S for enhanced coverage is applied for intra-frequency and inter-frequency cell reselection when the current serving cell can only be accessed using enhanced coverage", wherein it seems to handle all the frequencies as equal priority if the UE is in Enhanced Coverage. Since the SC-PTM reception in Enhanced Coverage was not clearly assumed in Rel-13, it would be confirmed that the current specification allows the UE in Enhanced Coverage to prioritize SC-PTM frequency as it is done in normal coverage. Also, RAN2 should discuss whether some small enhancements are necessary, e.g., to add notes in the specification.

Proposal 5: RAN2 should discuss and clarify whether the UE in Enhanced Coverage is allowed to prioritize the frequency providing multicast service of interest.

(2.2.3. Other Optimizations)

(2.2.3.1. Service Continuity)

In the current specification, SC-MCCH provides the neighbour cell information in SCPTM-NeighbourCellList, i.e., physical cell ID and frequency. If the UE is interested in a TMGI of which the serving cell does not provide SC-PTM, the UE needs to decode the neighbour cells' SC-MCCHs to seek the TMGI of interest. It would consume the UE's battery for additional decoding over inter-frequency measurements, which will have more impact on UE's mobility that is somewhat enhanced in this WI. So, it should be discussed whether some additional information needs to be broadcasted in order to facilitate FeMTC UEs mobility with low power consumption.

Proposal 6: RAN2 should discuss whether additional information is broadcasted in e.g., SC-MCCH, to assist the UE mobility with lower power consumption.

(2.2.3.2. One-Shot Multicasting)

As discussed in section 2.2.1, the use case of firmware/software update is the multicast-type service rather than the broadcast service. It could be also assumed that the firmware is a (set of) file(s), so it would be not efficient that the same firmware is multicasted many times. In the current MBMS service, it's assumed that "the application/service layer provides for each service the TMGI, the session start and end time, the frequencies and the MBMS service area identities" in the USD. It may allow performing a one-shot multicasting, i.e., the one firmware is multicasted only once, by setting appropriate start/end time in the USD. However, the USD should be obtained via unicast; therefore, the associated UEs needs to establish RRC Connection at least once when the firmware is delivered, which is not efficient from the perspectives of NW capacity and UE power consumption. So, it may need some sort of RAN-level optimizations, e.g., RAN-level information like the start/stop time, TMGI-based paging and so on, which may interact with/complement the USD.

Proposal 7: RAN2 should discuss whether RAN-level optimization to facilitate the one-shot multicast delivery is necessary.

The invention claimed is:

1. A user equipment for a mobile communication system, comprising:
a transceiver configured to transmit and receive radio signals within a reduced bandwidth narrower than a system transmission and reception band; and
a controller configured to perform radio communication with a base station by using the transceiver, the base station providing Multimedia Broadcast Multicast Service (MBMS) services via Single Cell Point-To-Multipoint (SC-PTM),
wherein the controller is configured to perform a process of receiving system information broadcast from the base station,
the system information includes information indicating a maximum number of repetitions of a first physical downlink control channel (PDCCH) corresponding to a Single Cell Multicast Control Channel (SC-MCCH), the first PDCCH having a bandwidth equal to or less than the reduced bandwidth,
the controller is further configured to perform a process of receiving control information via the SC-MCCH based on the information indicating the maximum number of repetitions of the first PDCCH, and
the control information includes information indicating a maximum number of repetitions of a second PDCCH corresponding to a Single Cell Multicast Traffic Channel (SC-MTCH), the second PDCCH having a bandwidth equal to or less than the reduced bandwidth.

2. The user equipment according to claim 1, wherein
the controller is configured to perform a process of receiving update notification information from the base station on a PDCCH having a bandwidth equal to or less than the reduced bandwidth, and
the update notification information includes at least one of
a first update notification that indicates update of the system information,
a second update notification that indicates update of the SC-MCCH, and
a third update notification that indicates update of a specific MBMS service indicated in the SC-MCCH.

3. The user equipment according to claim 1, wherein the controller is configured to perform a process of receiving, from the base station, information indicating that provision of a specific MBMS service is ended.

4. The user equipment according to claim 1, wherein
the controller is configured to perform a process of receiving, from the base station via a serving cell, a group RNTI associated with an MBMS service provided by a neighbour cell adjacent to the serving cell managed by the base station, and
the group RNTI is transmitted from the base station by the SC-MCCH.

5. A base station for a mobile communication system, comprising:
a controller configured to provide Multimedia Broadcast Multicast Service (MBMS) services via Single Cell Point-To-Multipoint (SC-PTM) to a user equipment configured to transmit and receive radio signals within a reduced bandwidth narrower than a system transmission and reception band, wherein
the controller is configured to perform a process of broadcasting system information,
the system information includes information indicating a maximum number of repetitions of a first physical downlink control channel (PDCCH) corresponding to a Single Cell Multicast Control Channel (SC-MCCH), the first PDCCH having a bandwidth equal to or less than the reduced bandwidth,
the controller is further configured to perform a process of transmitting control information via the SC-MCCH, and
the control information includes information indicating a maximum number of repetitions of a second PDCCH corresponding to a Single Cell Multicast Traffic Channel (SC-MTCH), the second PDCCH having a bandwidth equal to or less than the reduced bandwidth.

6. A method used in a mobile communication system comprising a user equipment configured to transmit and receive radio signals within a reduced bandwidth narrower than a system transmission and reception band and a base station configured to provide Multimedia Broadcast Multicast Service (MBMS) services via Single Cell Point-To-Multipoint (SC-PTM), the method comprising:
receiving system information broadcast from the base station, by the user terminal, wherein the system information includes information indicating a maximum number of repetitions of a first physical downlink control channel (PDCCH) corresponding to a Single Cell Multicast Control Channel (SC-MCCH), the first PDCCH having a bandwidth equal to or less than the reduced bandwidth; and
receiving control information via the SC-MCCH based on the information indicating the maximum number of repetitions of the first PDCCH, wherein the control information includes information indicating a maximum number of repetitions of a second PDCCH corresponding to a Single Cell Multicast Traffic Channel (SC-MTCH), the second PDCCH having a bandwidth equal to or less than the reduced bandwidth.

* * * * *